(12) United States Patent
Hansson (10) Patent No.: US 6,493,456 B1
(45) Date of Patent: Dec. 10, 2002

(54) THIN SPEAKER ASSEMBLIES INCLUDING LATERALLY OFFSET RESONATOR CAVITIES AND PERSONAL ELECTRONIC DEVICES INCLUDING THE SAME

(75) Inventor: Magnus F. Hansson, Apex, NC (US)

(73) Assignee: Telefonaktiebolaget L.M. Ericsson (SE)

( * ) Notice: Subject to any disclaimer, the term of this patent is extended or adjusted under 35 U.S.C. 154(b) by 28 days.

(21) Appl. No.: 09/691,620

(22) Filed: Oct. 18, 2000

(51) Int. Cl.$^7$ .................................................. H04R 1/02

(52) U.S. Cl. ........................ 381/345; 381/346; 455/351

(58) Field of Search ................................. 381/345, 346, 381/347, 348; 455/347, 350, 351; 379/433, 428

(56) References Cited

U.S. PATENT DOCUMENTS 6,104,808 A * 8/2000 Alameh et al. ............. 379/433

OTHER PUBLICATIONS

"How to Use" LT3XX Leak Tolerant Transducer, Kirk Acoustics Sound Solutions, Edition A, pp. 1–7, Feb. 3, 1998.
Motorola Cellular, V3620 Wireless Telephone Patent Information, 3 pages.

* cited by examiner

Primary Examiner—Sinh Tran
(74) Attorney, Agent, or Firm—Myers Bigel Sibley & Sajovec (57) ABSTRACT

A personal electronic device includes a main body and an ear flip member coupled to the main body. The ear flip member includes a speaker assembly. The speaker assembly includes a housing including front and rear opposed surfaces spaced apart along a depthwise axis. A transducer is disposed in the housing between the front and rear surfaces and along each of the depthwise axis, a longitudinal axis extending perpendicular to the depthwise axis, and a transverse axis extending transverse to the longitudinal axis and perpendicular to the depthwise axis. The housing defines a tuned resonator volume therein and in fluid communication with the transducer. At least a portion of the tuned resonator volume is disposed laterally adjacent the transducer along at least one of the longitudinal and transverse axes. The ear flip member may be coupled to a main body of a personal electronic device.

16 Claims, 5 Drawing Sheets

THIN SPEAKER ASSEMBLIES INCLUDING LATERALLY OFFSET RESONATOR CAVITIES AND PERSONAL ELECTRONIC DEVICES INCLUDING THE SAME

FIELD OF THE INVENTION

The present invention relates to speaker assemblies for personal use such as in cellular telephones and, more particularly, to relatively thin speaker assemblies.

BACKGROUND OF THE INVENTION

Manufacturers and designers of personal electronic devices such as cellular telephones (hereinafter "cell hones") and other wireless transmitters often desire to reduce the overall dimensions of such devices, particularly the overall dimensions of such a device when the device is in a stored or standby mode. However, designers are often constrained in reducing certain dimensions. In the case of a cellphone, it may be desirable for the distance between a microphone and an ear speaker of the cellphone to be at least a certain minimum distance apart in order to allow effective simultaneous positioning of the microphone adjacent the user's mouth and of the speaker adjacent the user's ear.

In order to reduce the size of a cellphone while still providing the necessary spacing between the microphone and the speaker when the cellphone is in use, it is known to mount the microphone in a relatively thin flip member that is hingedly coupled to the main body of the cellphone. It is also known to provide the ear speaker in a relatively thin flip member hingedly coupled to the main body of the cellphone. However, when the speaker is mounted in a relatively thin flip member, the sound quality experienced by the user, particularly the frequency response distribution in the frequency range of importance for voice communications, may be poor. Moreover, the sound quality may be significantly degraded if the flip is not substantially sealed against the user's ear to eliminate acoustic leak.

SUMMARY OF THE INVENTION

The present invention is directed to a personal electronic device or ear flip member including a transducer and a tuned resonator volume that is laterally offset from the transducer. By allowing the tuned resonator volume to be offset, the frequency response of the device may be improved without the need to substantially increase the thickness of the personal electronic device or ear flip member.

According to embodiments of the present invention, a personal electronic device includes a main body and an ear flip member coupled to the main body. The ear flip member includes a speaker assembly. The speaker assembly includes a housing including front and rear opposed surfaces spaced apart along a depthwise axis. A transducer is disposed in the housing between the front and rear surfaces and along each of the depthwise axis, a longitudinal axis extending perpendicular to the depthwise axis, and a transverse axis extending transverse to the longitudinal axis and perpendicular to the depthwise axis. The housing defines a tuned resonator volume therein and in fluid communication with the transducer. At least a portion of the tuned resonator volume is disposed laterally adjacent the transducer along at least one of the longitudinal and transverse axes.

The tuned resonator volume may extend the frequency response of the speaker assembly in a prescribed frequency range.

The personal electronic device may include a load hole assembly in the housing. The load hole assembly includes at least one port extending fully through the housing to fluidly connect the front and rear surfaces.

According to further embodiments of the present invention, an ear flip member includes a speaker assembly. The speaker assembly includes a housing including front and rear opposed surfaces spaced apart along a depthwise axis. A transducer is disposed in the housing between the front and rear surfaces and along each of the depthwise axis, a longitudinal axis extending perpendicular to the depthwise axis, and a transverse axis extending transverse to the longitudinal axis and perpendicular to the depthwise axis. The housing defines a tuned resonator volume therein and in fluid communication with the transducer. At least a portion of the tuned resonator volume is disposed laterally adjacent the transducer along at least one of the longitudinal and transverse axes.

According to further aspects of the present invention, a method for improving the frequency response of a transducer in an ear flip member includes mounting the transducer in a housing of the ear flip member. A tuned resonator volume is provided in the housing laterally adjacent and in fluid communication with the transducer. The tuned resonator volume is tuned to extend the frequency response of the speaker assembly in a prescribed frequency range.

According to embodiments of the present invention, a personal electronic device includes a main body and an ear flip member coupled to the main body. The ear flip member includes a speaker assembly. The speaker assembly includes a housing including front and rear opposed surfaces. A transducer is disposed in the housing between the front and rear surfaces. The speaker assembly further includes a tuned resonator cavity in the housing that is laterally offset from the transducer, is in fluid communication therewith, and extends from adjacent the front surface to adjacent the rear surface.

Objects of the present invention will be appreciated by those of ordinary skill in the art from a reading of the Figures and the detailed description of the preferred embodiments which follow, such description being merely illustrative of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention may be employed in various personal electronic devices, and is particularly suitable for use in wireless transmitters such as radiotelephones. Radiotelephones generally refer to communications terminals which provide a wireless communications link to one or more other communications terminals. Radiotelephones may be used in a variety of different applications, including cellular telephone ("cellphone"), land-mobile (e.g., police and fire departments), and satellite communications systems. The present invention is described hereinbelow in association with a cellphone; however, the present invention may be used in other radiotelephone or personal electronic devices.

Figure 1:
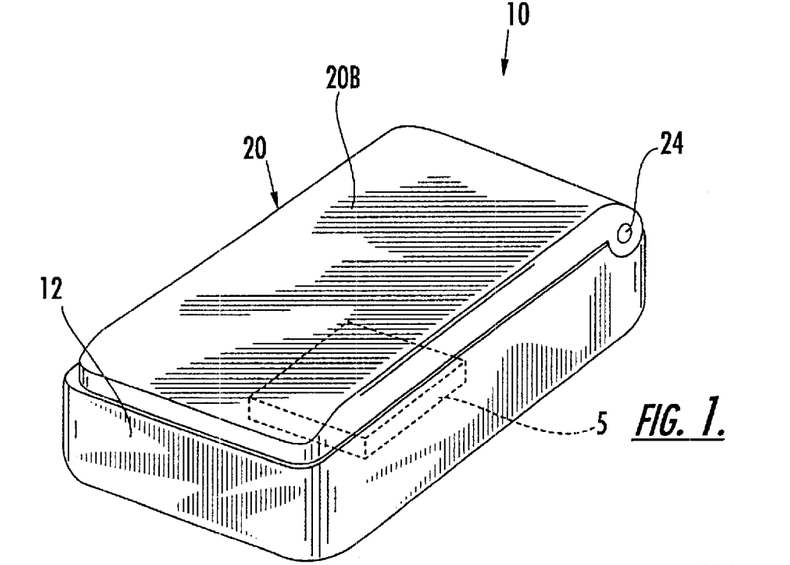
FIG. 1 is a perspective view of a cellphone according to the present invention in a closed position.
Figure 2:
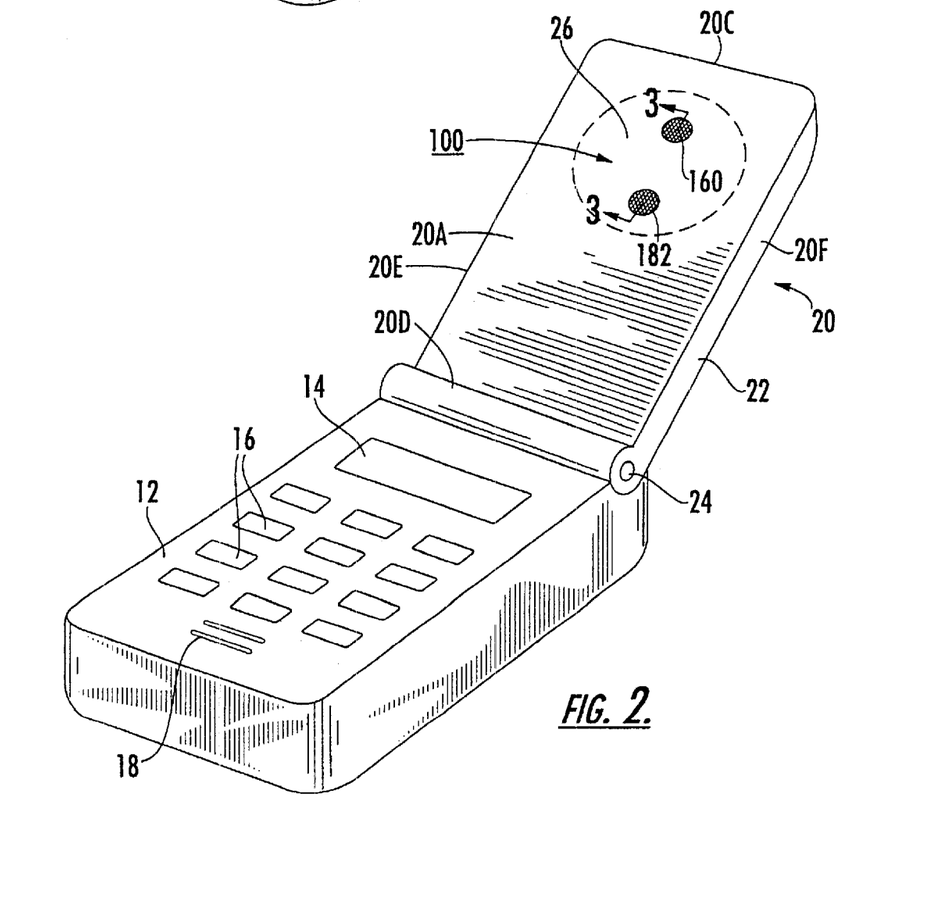
FIG. 2 is a perspective view of the cellphone of FIG. 1 in an open position.

With reference to FIGS. 1 and 2, a cellphone according to embodiments of the present invention is shown therein and designated generally 10. The cellphone 10 includes a main body 12 having a casing which may house various electrical components such as a wireless transceiver for receiving and transmitting radiotelephone signals and a processor for processing the radiotelephone signals (collectively and schematically indicated as element 5 in FIG. 1). In conventional manner, the main body 12 has a display 14, a plurality of keys or buttons 16, and a microphone 18.

An ear flip assembly 20 is coupled to the main body 12 by a hinge 24. The ear flip assembly 20 includes a housing 22 and is pivotable about the main body 12 between a stored or closed position as shown in FIG. 1 and an open or operational position as shown in FIG. 2. With reference to FIGS. 1 and 2, the flip assembly 20 has a front surface 20A, a rear surface 20B, a top end 20C, a bottom end 20D, a left side 20E, and a right side 20F. The flip assembly 20 includes a recessed region 26 adapted for placement adjacent the user's ear so that the housing 22 forms a substantially complete or partial seal against the user's ear.

When the flip assembly 20 is in the open, operational position, the distance between the region 26 and the microphone 18 corresponds to the distance between a typical user's ear and mouth. More preferably, the distance between the region 26 and the microphone 18 is between about 120 mm and 150 mm. In order to provide the cellphone 10 with a compact size when closed, the housing 22 has a thickness S (FIG. 3) which is much smaller than the length extending between ends 20C and 20D and the width extending between sides 20A and 20F.

The flip assembly 20 further includes a speaker assembly 100 forming a part thereof. The speaker assembly 100 is designed to be leak tolerant (i.e., to provide low acoustic impedance) as well as to have a relatively thin profile. The speaker assembly 100 is further designed to provide extended frequency response at higher frequencies. The speaker assembly 100 may provide a more uniform frequency response across a broader frequency range. Moreover, the speaker assembly 100 is adapted to provide a preferred relationship between the frequency response of the speaker assembly 100 when employed without an acoustic leak (e.g., the flip assembly 20 being fully sealed against the user's ear) and when employed with an acoustic leak.

Figure 3:
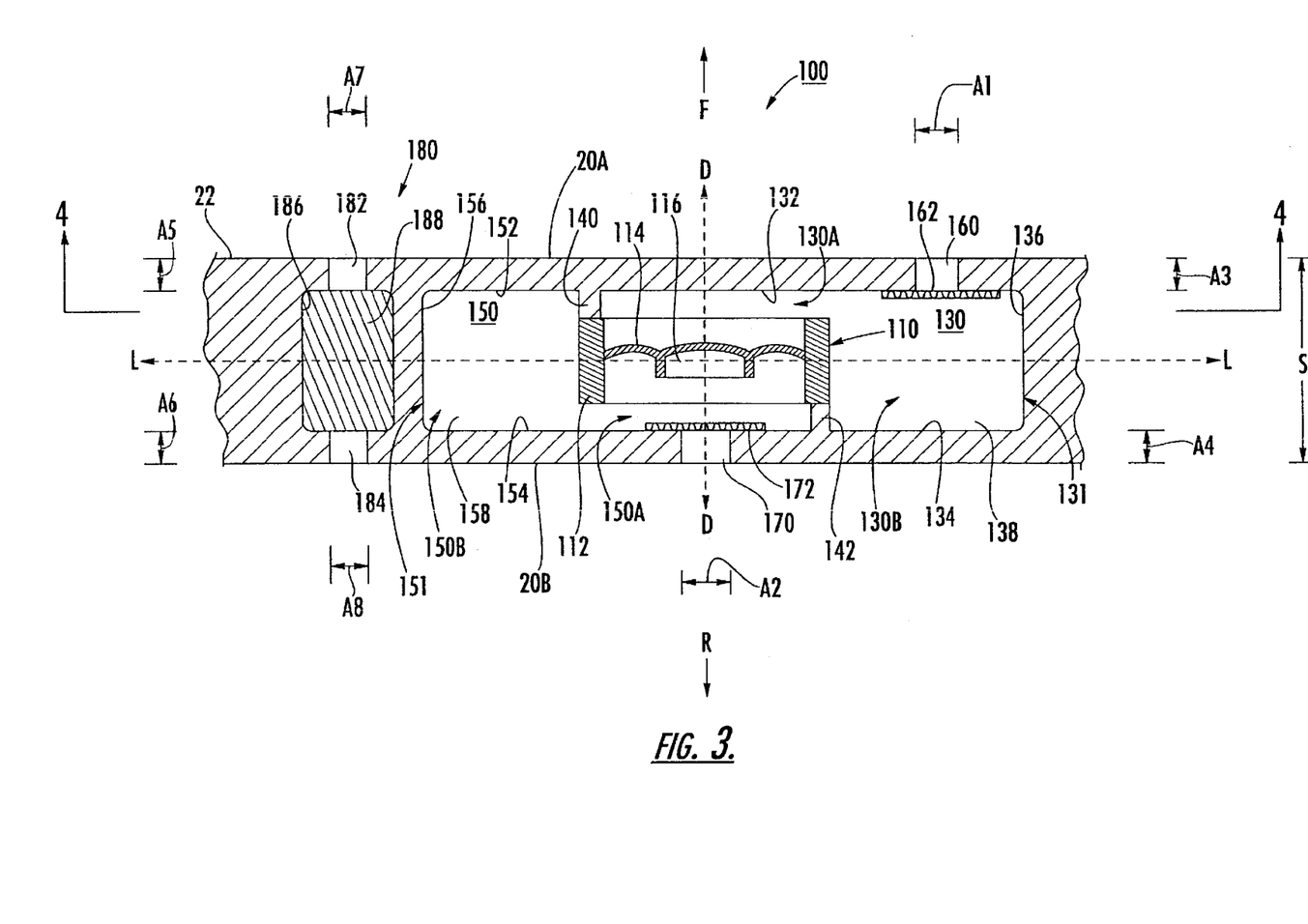
FIG. 3 is a cross-sectional view of the cellphone of FIG. 1 taken along the line 3—3 of FIG. 2 and showing a speaker assembly according to the present invention.
Figure 4:
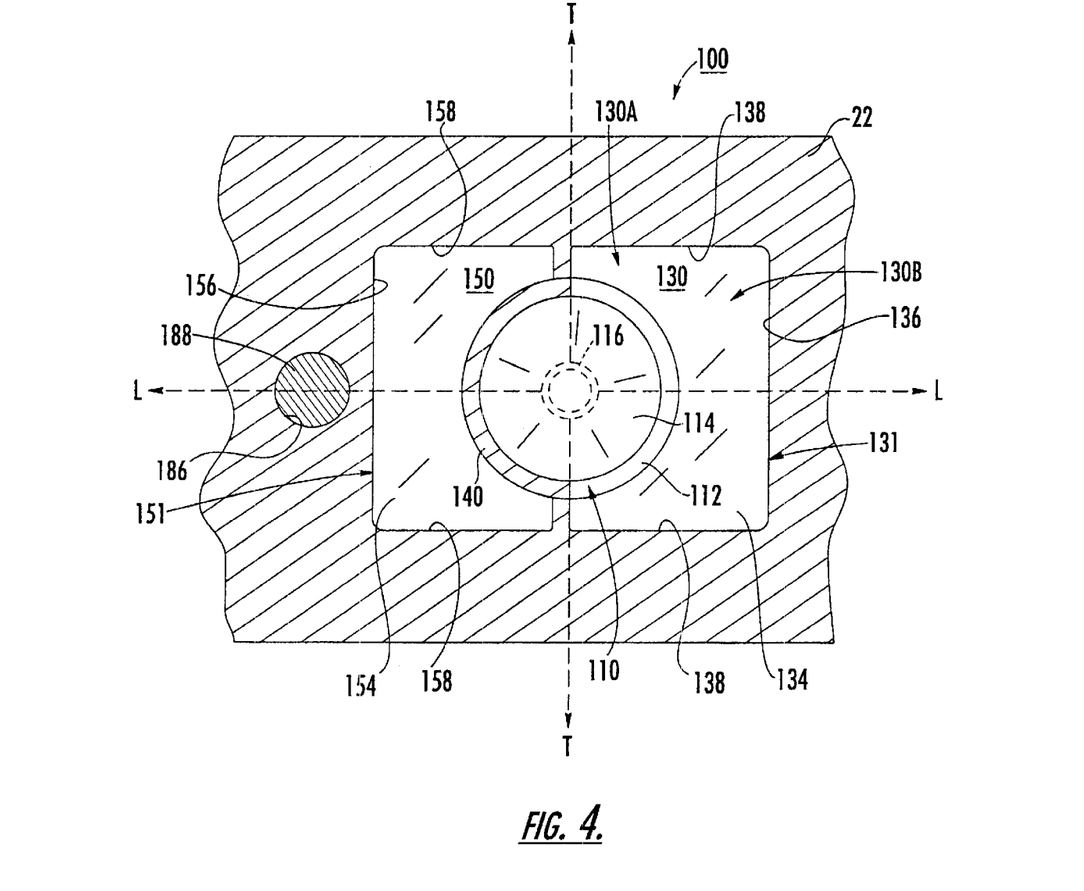
FIG. 4 is a cross-sectional view of the speaker assembly of FIG. 3 taken; along the line 4—4 of FIG. 3.

With reference to FIGS. 3 and 4, the speaker assembly 100 is shown therein in cross-section. The speaker assembly 100 has a depthwise axis D—D (FIG. 3), a longitudinal axis L—L (FIGS. 3 and 4) which is perpendicular to the depthwise axis D—D, and a transverse axis T—T (FIG. 4) which is transverse to the longitudinal axis L—L and perpendicular to the depthwise axis D—D.

The speaker assembly 100 includes a transducer 110 and a portion of the housing 22 which surrounds the transducer 110. As discussed in further detail below, the housing 22 and the transducer 110 define a front tuned resonator volume 130 and a rear tuned resonator volume 150 and associated tuned ports 160 and 170. The speaker assembly 100 further includes a load hole assembly 180. The volumes 130, 150, the tuned ports 160, 170, and the load hole assembly 180 can serve to enhance the acoustic response of the speaker assembly 100 for the intended use.

The transducer 110 may be any suitable acoustic transducer and is preferably a relatively low resonance frequency transducer (i.e., exhibiting resonance between about 350 and 450 Hz). As illustrated, the transducer 110 includes a housing 112, a membrane 114 spanning the housing 112, and a coil 116 suspended by the membrane 114. For clarity, other components of the transducer 110 (a magnet and electrical leads) are not shown in the drawings. Suitable transducers for the transducer 110 include the LT3XX Leak Tolerant Transducer available from Kirk Acoustics.

The transducer 110 is disposed between the front and rear surfaces 20A, 20B such that it is positioned along each of the depthwise axis D—D, the longitudinal-axis L—L, and the transverse axis T—T. Preferably and as shown, the transducer 110 is oriented such that the front side of the transducer 110 (i.e., the front side of the membrane 114) faces in a forward direction F (i.e., toward the front surface 20A), and the rear side of the transducer 110 (i.e., the rear side of the membrane 114) faces in a rearward direction R (i.e., toward the rear surface 20B). The transducer 110 is thereby operative to direct sound waves directly in the forward direction F and in the rearward direction R. The transducer 110 is securely held in place by continuous ribs or projecting walls 140 and 142. Owing to the desire for a membrane of sufficient size, the transducer 110 typically has a length or diameter substantially greater than its thickness.

The front tuned resonator volume 130 is defined by a front wall 132, a rear wall 134, an end wall 136, opposed side walls 138, and the projecting walls 140, 142. As best seen in FIG. 4, each of the projecting walls 140, 142 is coextensive with a peripheral portion of the speaker housing 112, extends continuously from one side wall 138 or 158 to the other side wall 138 or 158, and intersects the other of the projecting walls 140 and 142. In this manner, the speaker housing 112, the membrane 114, the coil 116, the front wall 132, the rear wall 134, the end wall 136, the side walls 138, the front projecting wall 140, and the rear projecting wall 142 form a chamber 131 defining the volume 130 which is fully enclosed except for the port 160. The membrane 114 is in fluid communication with the volume 130.

The volume 130 includes a front volume 130A defined between the front of the transducer 110 and the front wall 132 and positioned adjacent the transducer 110 along the depthwise axis D—D. The volume 130 also includes a side volume 130B contiguous with the volume 130A and defined between the side of the transducer 110, the end wall 136 and the side walls 138. The side volume 130B is positioned laterally adjacent and offset from the transducer 110 both along the longitudinal axis L—L and along the transverse axis T—T. Preferably and as shown, the side volume 130B comprises a major portion of the volume 130. More preferably, the size of the side volume 130B is at least four (4) times the size of the front volume 130A.

A chamber 151 defining the rear tuned resonator volume 150 is constructed in a manner similar to that of the chamber 131 defining the front tuned resonator volume 130. The rear tuned resonator volume 150 is defined by a front wall 152, a rear wall 154, an end wall 156, opposed side walls 158 and the projecting walls 140, 142. As best seen in FIG. 4, the speaker housing 112, the membrane 114, the coil 116, the front wall 152, the rear wall 154, the end wall 136, the opposed side walls 158, and the projecting walls 140, 142 form the chamber 151 which is fully enclosed except for the port 170. The membrane 114 is in fluid communication with the volume 150.

The volume 150 includes a rear volume 150A defined between the rear of the transducer 110 and the rear wall 154 and positioned adjacent the transducer 110 along the depthwise axis D—D. The volume 150 also includes a side volume 150B contiguous with the volume 150A and defined between the side of the transducer 110, the end wall 156, and the side walls 158. The side volume 150B is positioned laterally adjacent and offset from the transducer 110 both along the longitudinal axis L—L and along the transverse axis T—T. Preferably and as shown, the side volume, 150B comprises a major portion of the volume 150. More preferably, the size of the side volume 150B is at least four (4) times the size of the rear volume 150A.

The front tuned port 160 is positioned over and communicates with the volume 130B. A cloth 162 covers the port 160 on the interior of the housing 22. The rear tuned port 170 is positioned under and communicates with the volume 150B. A cloth 172 covers the port 170 on the interior of the housing 22. The cloths 162, 172 may be held in place by adhesive or other suitable means.

The load hole assembly 180 includes a pair of opposed ports 182 and 184 and a cavity 186 defined in the housing 22 therebetween and communicating with the ports 182, 184. A plug 188 of acoustic resistive material such as foam is disposed in the cavity 186.

Notably, the overall thickness S (see FIG. 3) of the speaker assembly 100 and, hence, the associated portion of the flip assembly 20, is the sum of the thicknesses of the casing at the front wall 132 and at the rear wall 154, the thickness of the speaker housing 112, and the heights of the volumes 130A and 150A. While additional volumes 130B and 150B are provided, these additional volumes are disposed on lateral sides of the transducer 110 and need not contribute to the thickness of the speaker assembly 100. In this manner, a relatively thin ear flip assembly 20 may be provided while retaining certain preferred acoustic attributes.

As discussed above, the volumes 130 and 150 are tuned resonator volumes. More particularly, the sizes of the volumes 130 and 150, the lengths A3 and A4 of the ports 160 and 170, and the widths A1 and A2 of the ports 160 and 170 are selected to provide the acoustic response behaviors described below. The tuned resonator volumes 130, 150 and the tuned ports 160, 170 serve to extend the frequency response of the speaker assembly 100 (and, hence, the perceived sensitivity at the user's ear) at the frequencies for which these features are tuned. In the speaker assembly 100, as discussed in more detail below, the volume 150 and the port 170 are tuned for a first frequency range, and the volume 130 and the port 160 are tuned for a second frequency range. By selecting the cloths 162, 172 with the appropriate acoustic resistances, the desired acoustic damping of the resonator volumes 130, 150 can be achieved.

Similarly, the performance of the load hole assembly 180 is determined or adjusted by selecting the lengths A5 and A6 of the ports 182 and 184, the widths A7 and A8 of the ports 182 and 184, the volume of the cavity 186, and the material of the plug 188 to provide the acoustic response behaviors described below. Alternatively, the plug 188 may be replaced with one or more suitably constructed cloths or the like.

Figure 5:
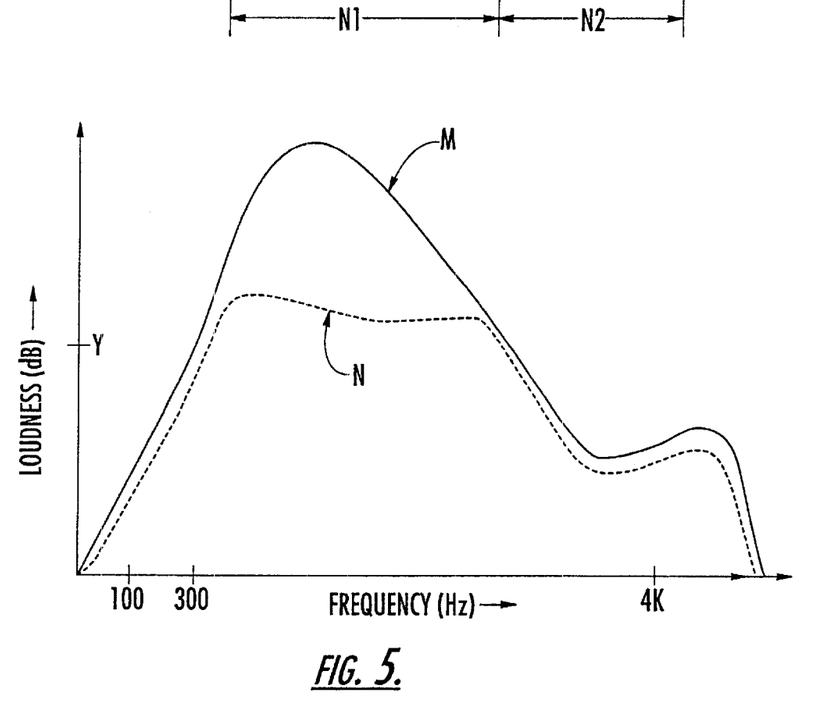
FIG. 5 graphically illustrates the frequency response of a speaker assembly not having a load hole assembly and the frequency response of a speaker assembly having a load hole assembly according to the present invention.
Figure 6:
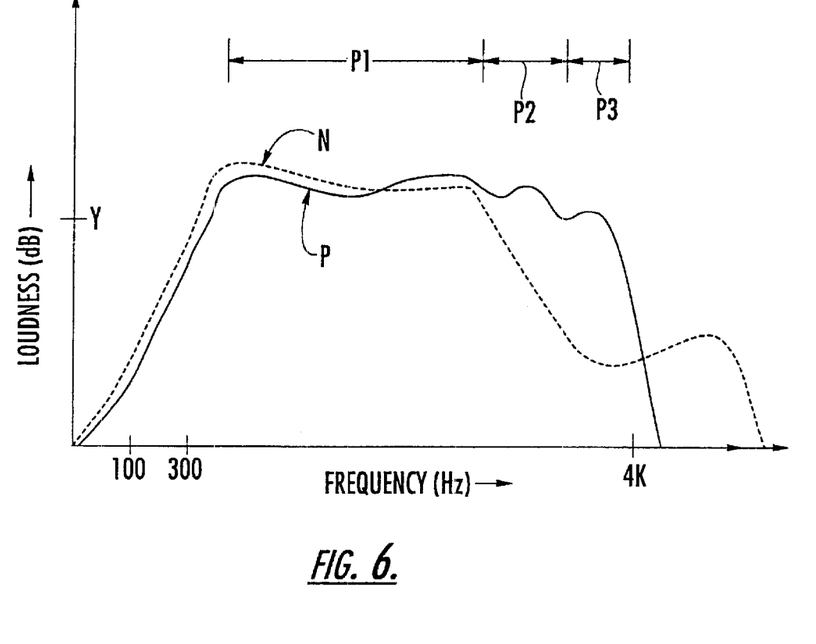
FIG. 6 graphically illustrates the frequency response of a speaker assembly having a load hole assembly and the frequency response of the speaker assembly of FIG. 3.
Figure 7:
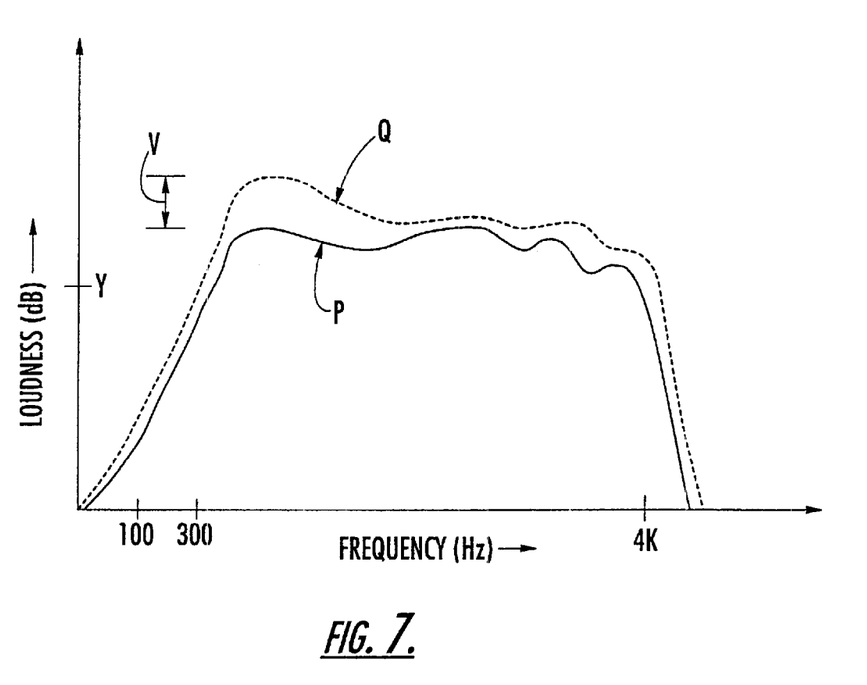
FIG. 7 graphically illustrates the frequency response of the speaker assembly of FIG. 3 when used in a low leak manner and the frequency response of the speaker assembly of FIG. 3 when used in a no leak manner.

The acoustic response and performance benefits of the speaker assembly 100 may be better appreciated with reference to the performance graphs of FIGS. 5–7 commonly referred to as frequency response curves. The graphs therein illustrate, for different speaker configurations and flip positions with respect to the user, the loudness (in decibels) as received by a user's ear as a function of frequency (e.g., in hertz). The graphs demonstrate general trends and comparative responses in the frequency range typically of concern for cellphones i.e., from about 300 to 3400 Hz, commonly referred to as the Telecom Bandwidth).

Referring now to FIG. 5, a first curve M represents the response which may be expected from a flip speaker assembly as described above (including ports and cloths corresponding to the ports 160, 170 and the cloths 162, 172) but not having tuned resonator volumes corresponding to the volumes 130, 150 and also not having a load hole assembly corresponding to the load hole assembly 180. The curve M indicates the response when the speaker assembly is not fully sealed against the user's ear so that a low acoustic leak is present as may be modeled by an ITU P.57 Type 3.2 Low Leak Ear Simulator. Notably, the response is very peaky, exhibiting inordinately high sensitivity at relatively low frequencies and general non-uniformity across the frequency range of concern.

With continued reference to FIG. 5, a second curve N represents the response (with low leak) of a speaker assembly corresponding to the speaker assembly 100 (including ports and cloths corresponding to the ports 160, 170 and the cloths 162, 172) except without the provision of the volumes 130, 150, but including the load hole assembly 180. The load hole assembly 180 has the effect of reducing the peak of the response curve M so that a flatter or more uniform response is provided across a larger range of the frequency range of concern. Thus, across a frequency range N1 a preferred, flatter acoustic response is provided. However, across a further, higher frequency range N2, also within the frequency range of concern, the speaker assembly retains substantially the same rolled off response as the speaker assembly corresponding to the curve M. The load hole assembly is preferably tuned to reduce the sensitivity to no less than a nominal loudness Y.

With reference to FIG. 6, the curve N is shown along with a curve P representing the response (with low leak) of the speaker assembly 100. As a result of the load hole assembly 180, across a first, lower frequency range P1, the speaker assembly 100 retains substantially the same relatively flat response as the speaker assembly corresponding to the curve N. The volume 150 and the port 170 extend the high frequency response (i.e., provide an improved, higher sensitivity or lower impedance) in a second, higher frequency range P2 as compared to the corresponding frequency response of the speaker assembly corresponding to the curve N. Additionally, the volume 130 and the port 160 extend the high frequency response (i.e., provide an improved, higher sensitivity or lower impedance) in a second, higher frequency range P3 as compared to the corresponding frequency response of the speaker assembly corresponding to the curve N. Preferably, the volumes 130, 150 and ports 160, 170 are tuned to provide a sensitivity of no less than the nominal loudness Y across the frequency range of concern.

As will be appreciated by those of skill in the art, the improvements to the sensitivity of the speaker assembly in the ranges P2 and P3 can provide a more usable and uniform response across a broader range and, more particularly, across a broader portion of the overall frequency range of concern. In particular, leak tolerant designs often suffer from low sensitivity in the higher frequency ranges. The tuned volumes 130, 150 and ports 160, 170 may serve to improve the sensitivity in these frequency ranges.

As noted above, the curve P represents the frequency response experienced by the user when the housing 22 is held to the user's ear so as to allow a low acoustic leak, for example as modeled by an ITU P.57 Type 3.2 Low Leak Ear Simulator. With reference to FIG. 7, the curve P is shown along with a curve Q representing the response of the speaker assembly 100 when the speaker assembly 100 is fully sealed to the user's ear, for example as may be modeled by an ITU P.57 Type 3.18 No Leak Ear Simulator. The response behavior, as well as the relationship between the no leak and low leak responses, may be important in practice. Different users may use the cellphone in a manner that provides no leak, low leak or both at different times.

With continued reference to FIG. 7, the curve Q (no leak) is higher than the curve P (low leak) at low frequencies in the range of concern, and at medium and high frequencies in the range of concern the curve Q is nominally higher than the curve P. Because of the provision of the load hole assembly 180, the maximum differential V between the sensitivity curves P and Q is relatively small, preferably no more than 2 decibels. Moreover, the shapes of the curves Q and P are substantially the same or very similar. The similarities between the no leak and low leak responses of the speaker assembly 100 provide both substantially consistent sensitivity levels and distributions whether the speaker assembly is used in either a low leak manner or a no leak manner. Thus, the speaker assembly 100 is leak tolerant and also effectively accommodates no leak usage.

The speaker assembly 100 is not limited to the particular design as illustrated and described herein but may be suitably modified to adjust the acoustic performance, physical dimensions and/or appearance of the speaker assembly. For example, additional front tuned resonator volumes 130, rear tuned resonator volumes 150, front ports 160 and/or rear ports 170 may be provided. The tuned volumes 130, 150 may be expanded or reduced. The shapes of the tuned volumes 130, 150 may be modified. For example, each of the front and rear volumes 130, 150 may include side volumes on opposed lateral sides of the transducer so that the volumes 130, 150 include side volumes on the same lateral side or sides of the transducer. The end connections (i.e., the relationship between the exits of the ports and the adjacent walls) of the ports 160, 170 may be altered. Other suitable modifications will be apparent to those of skill in the art upon reading the description herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A personal electronic device comprising:
  a) a main body; and
  b) an ear flip member coupled to said main body and including a speaker assembly, said speaker assembly comprising:
    (1) a housing including front and rear opposed surfaces spaced apart along a depthwise axis;
    (2) a transducer disposed in said housing between said front and rear surfaces and along each of said depthwise axis, a longitudinal axis extending perpendicular to said depthwise axis, and a transverse axis extending transverse to said longitudinal axis and perpendicular to said depthwise axis; and
    (3) said housing defining a tuned resonator volume therein and in fluid communication with said transducer, at least a portion of said tuned resonator volume being disposed laterally adjacent said trasducer along at least one of said longitudinal and transverse axes;
    (4) wherein said transducer has front and rear opposed sides and said tuned resonator volume comprises:
      a front volume disposed adjacent said transducer between said front side of said transducer and said front surface along said depthwise axis; and
      a side volume contiguous with said front volume and disposed adjacent said transducer along at least one of said longitudinal and transverse axes;
    (5) wherein said personal electronic device further includes a tuned port defined in said housing and fluidly connecting said front surface and said tuned resonator volume; and
    (6) wherein said tuned port is entirely laterally offset from said transducer.

2. A personal electronic device comprising:
  a) a main body; and
  b) an ear flip member coupled to said main body and including a speaker assembly, said speaker assembly comprising:
    (1) a housing including front and rear opposed surfaces spaced apart along a depthwise axis;
    (2) a transducer disposed in said housing between said front and rear surfaces and along each of said depthwise axis, a longitudinal axis extending perpendicular to said depthwise axis, and a transverse axis extending transverse to said longitudinal axis and perpendicular to said depthwise axis; and
    (3) said housing defining a tuned resonator volume therein and in fluid communication with said transducer, at least a portion of said tuned resonator volume being disposed laterally adjacent said transducer along at least one of said longitudinal and transverse axes;
    (4) wherein said transducer has front and rear opposed sides and said tuned resonator volume comprises:
      a front volume disposed adjacent said transducer between said front side of said transducer and said front surface along said depthwise axis; and
      a side volume contiguous with said front volume and disposed adjacent said transducer along at least one of said longitudinal and transverse axes; and (5) wherein said personal electronic device further includes a second tuned resonator volume, said second tuned resonator volume comprising:
  a rear volume disposed adjacent said transducer between said rear side of said transducer and said rear surface along said depthwise axis; and
  a second side volume contiguous with said rear volume and disposed adjacent said transducer along at least one of said longitudinal and transverse axes.

3. The personal electronic device of claim 2 wherein said first tuned resonator volume extends a frequency response of said speaker assembly in a first prescribed frequency range and said second tuned resonator volume increases the frequency response of said speaker assembly in a second prescribed frequency range.

4. The personal electronic device of claim 2 wherein said second tuned resonator volume extends the high frequency response of said speaker assembly.

5. The personal electronic device of claim 2 including a tuned port defined in said housing and fluidly connecting said rear surface and said second tuned resonator volume.

6. The personal electronic device of claim 5 wherein said tuned port underlies said transducer.

7. The personal electronic device of claim 5 including an acoustic resistive material covering said tuned port.

8. The personal electronic device of claim 2 wherein said second side volume comprises a major portion of said second tuned resonator volume.

9. The personal electronic device of claim 2 wherein said first and second tuned resonator volumes are fluidly isolated from each other within said housing and are separated from one another by said transducer.

10. A wireless terminal comprising:
  a) a main body including a microphone;
  b) a wireless transceiver in said main body; and
  c) an ear flip member pivotably coupled to said main body and including a speaker assembly, said speaker assembly comprising:
    (1) a housing including front and rear opposed surfaces spaced apart along a depthwise axis;
    (2) a transducer having front and rear opposed sides and disposed in said housing between said front and rear surfaces and along each of said depthwise axis, a longitudinal axis extending perpendicular to said depthwise axis, and a transverse axis extending transverse to said longitudinal axis and perpendicular to said depthwise axis; and
    (3) said housing defining a first tuned resonator volume therein and in fluid communication with said transducer, said first tuned resonator volume including:
      a front volume disposed adjacent said transducer between said front side of said transducer and said front surface along said depthwise axis; and
      a first side volume contiguous with said front volume and disposed adjacent said transducer along at least one of said longitudinal and transverse axes;
      wherein said first side volume comprises a major portion of said first tuned resonator volume;
    (4) said housing defining a second tuned resonator volume therein and in fluid communication with said transducer, said second tuned resonator volume including:
      a rear volume disposed adjacent said transducer between said rear side of said transducer and said rear surface along said depthwise axis; and
      a second side volume contiguous with said rear volume and disposed adjacent said transducer along at least one of said longitudinal and transverse axes;
      wherein said second side volume comprises a major portion of said second tuned resonator volume;
    (5) a first tuned port defined in said housing and fluidly connecting said front surface and said first tuned resonator volume; and
    (6) a second tuned port defined in said housing and fluidly connecting said rear surface and said second tuned resonator volume.

11. The personal electronic device of claim 10 including an acoustic resistive material covering at least one of said first and second tuned ports.

12. The personal electronic device of claim 10 wherein said first tuned resonator volume extends a frequency response of said speaker assembly in a first prescribed frequency range and said second tuned resonator volume increases the frequency response of said speaker assembly in a second prescribed frequency range.

13. The personal electronic device of claim 12 wherein said first and second tuned resonator volumes extend the high frequency response of said speaker assembly.

14. The personal electronic device of claim 10 including a load hole assembly in said housing, said load hole assembly including:
  at least one load hole port extending fully through said housing to fluidly connect said front and rear surfaces; and
  an acoustic resistive material disposed in said housing within said at least one port and between said front and rear surfaces, said acoustic resistive material including a foam plug.

15. The personal electronic device of claim 14 wherein said load hole assembly flattens the frequency response of said speaker assembly over a prescribed frequency range.

16. The personal electronic device of claim 10 wherein said first and second tuned resonator volumes are fluidly isolated from each other within said housing and are separated from one another by said transducer.

* * * * *